June 17, 1958

T. IMMESBERGER 2,839,177

TOTE BOX TRANSFER APPARATUS

Filed May 2, 1955

INVENTOR:
Theobald Immesberger

By
His Agent

June 17, 1958  T. IMMESBERGER  2,839,177
TOTE BOX TRANSFER APPARATUS
Filed May 2, 1955  2 Sheets-Sheet 2
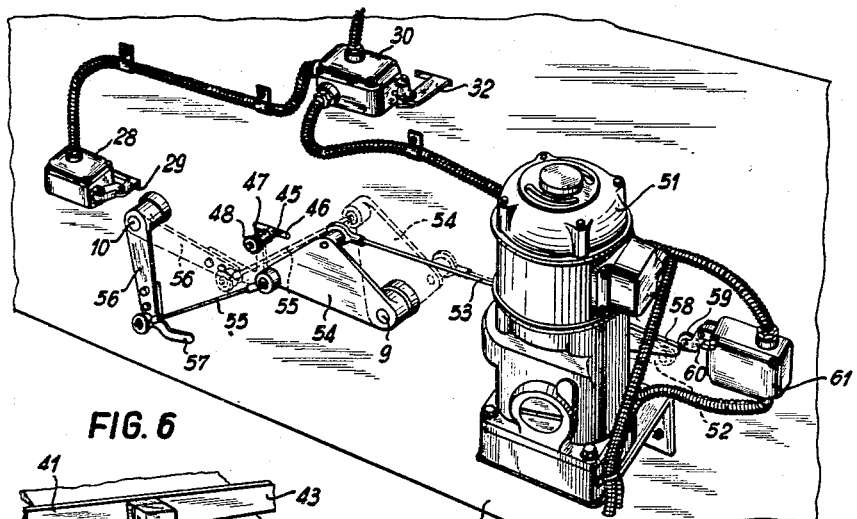
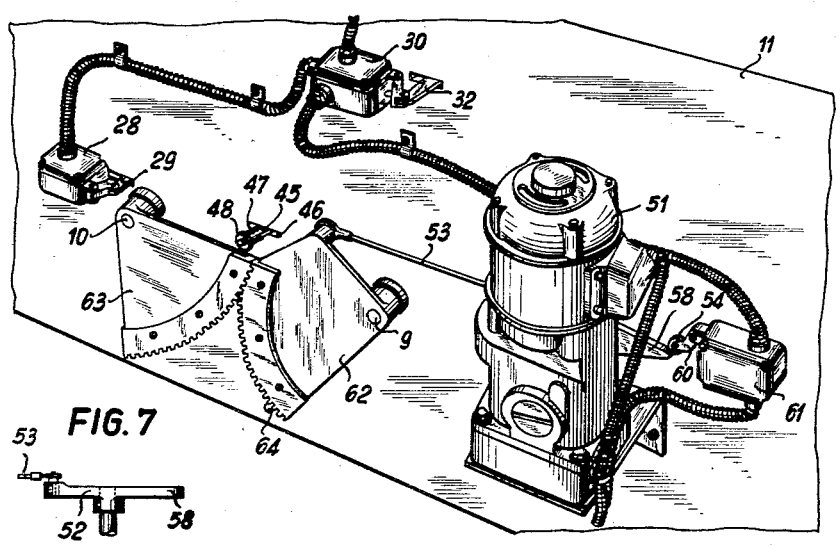
INVENTOR:
Theobald Immesberger,
By [signature]
His Agent.

United States Patent Office 2,839,177
Patented June 17, 1958

2,839,177

TOTE BOX TRANSFER APPARATUS

Theobald Immesberger, Kaiserslautern, Germany, assignor to G. M. Pfaff A.-G., Kaiserslautern, Pfalz, Germany, a German joint-stock company Application May 2, 1955, Serial No. 505,434

Claims priority, application Germany May 3, 1954

5 Claims. (Cl. 198—21)

The present invention relates to apparatus for transferring "tote" boxes between conveyors travelling in opposite directions and particularly to the transfer of boxes fitted with rollers or runners, from one belt conveyor, provided for example, with lateral guides, to a second belt conveyor travelling beside the first.

In factories it is frequently necessary to convey moderately sized work pieces in groups located in boxes which are moved by belts. In order that the boxes may be stopped at predetermined points by catches, and to reduce friction on the belts to a minimum, the boxes are preferably fitted with rollers or spherical members on their bases.

To conserve space, belt conveyors are often combined in pairs to form conveyor systems, in which for example two parallel belts may travel in opposite directions. In many cases the working places are so arranged on both sides of the belts that all the operatives face the same direction. The successive working processes are usually arranged one behind the other in the direction of movement of the belt. Good use is made of the space if the belt travels with the other half of the working processes arranged opposed to the first half. It is then necessary to transfer the boxes for the work pieces from the first to the second belt, in which case, however owing to the seating arrangement, the card index guides usually mounted on the "tote" boxes must remain legible to the workers on both belts, that is to say, the "tote" boxes must not be turned as they are transferred.

This is also the case when the "tote" boxes have to be changed over not only at the beginning or the end of a belt system, but with conveyor belts travelling in the same direction, when, for example, a possibility of transference must be provided at a certain position or at the end of a rather short belt. It must also be considered that the work pieces cannot always be finished with only one passage of the boxes past the processing machines and therefore the belts have to be used partly as supply feeders in order to increase the elasticity of production. In these cases also it is necessary to transfer "tote" boxes from one belt to the other, during which the "tote" boxes should not be turned.

The primary object of the invention is to effect the change over of the "tote" boxes from one belt to the other automatically by mechanical means without interference with the conveyor system as a whole. Other objects are to urge the boxes from one conveyor to another by an impulse movement in addition to the continued movement of the conveyor belt to allow this to be controlled by safety devices and switch elements in such manner that boxes arriving irregularly at the transfer point do not disturb the course of movement.

The present invention achieves the objectives in that at the transfer point from one conveyor belt to the other, which point is provided with a plate for bridging over the two belts, a switch is arranged for a motor, such as a reversing or gear motor, against which a "tote" box carried by the incoming conveyor belt runs after influencing an approach catch for stopping following boxes, whereby the motor acting on a driving mechanism is energised, said driving mechanism being in effective connection with pivotal elements constructed in the form of two arms or the like devices, mounted in spaced relation one behind the other in the direction of conveying and adapted to pivot in opposite directions to press the box sideways over said plate on to the other conveyor belt by an impulse movement, in addition to its advancing movement due to the conveyor belt and then to return the arms to their original position. Further by the present invention the drive is switched off by the movement of parts of the driving mechanism, while a safety switch is provided preventing an "on" switch, which the transferred "tote" box acts, being again operated until the transferred box is removed from the transfer point by the second conveyor belt.

The invention also includes the feature that approach catch preventing the approach of a following box is positively disengaged by the driving mechanism at the end of the swinging-out movement of the arms, thereby enabling the approach of a following box to the transfer point to be permitted.

The approach catch preferably consists of a stop displaceable into the oncoming path of the box and is arranged at the end of the arm of a double-armed lever which has at the end of its opposed shorter arm a wedge-shaped attachment, for instance, or the like, which may be downwardly displaced by the box moving into the transfer point, whilst a resetting lever may be provided which is pivotable by a release member provided on parts of the driving mechanism.

The new apparatus conveniently is so constructed that a base plate is arranged under the conveyor belts running side by side in parallel and this base plate carries electric switches, the bearing of the approach catch lever, the motor, the rotatable bolts of the arm and the driving gear members or actuating elements, respectively, for the arms.

The construction of the driving gear members or actuating elements, respectively, for the arms may be effected in various ways. For example the apparatus may be characterised by the driving gear, which is driven by a reversing motor, consisting of a threaded spindle, a spindle nut arranged thereon on a cross head having roller bolts which are secured to the ends thereof and engage in guide slots in levers which are firmly located on the bearings of the arms in such a way that the actuating levers are carried along and pivoted by the movement of the cross head in the direction of the spindle.

At the same time a reversing switch and a cut off switch for the reversing motor are preferably arranged in the pivoting ranges of the actuating levers. The cross head may be provided with a release pin or the like, which acts on a roller, or the like, of the resetting lever for the approach catch in the path of movement of the cross head. The arrangement may be made in such a way that the driving gear driven by a driving motor consists of a crank with a toggle link which operates on the bolts of the arms by actuating elements, and that the crank has an extension projecting beyond the axis of rotation in the path of rotation of which a cut out switch is arranged for the motor. In this case it is possible for the toggle link to influence a guide plate or the like which is secured to the bolt of one arm and is coupled in its turn by means of a toggle link with the actuating lever of the other arm, preferably carrying a release finger for the resetting lever of the approach stop. However, the toggle link may also act, in a different form of construction, on a toothed segment which is secured to the bolts of one arm and meshes with a toothed segment located on the bolt of the other arm. The latter can then preferably carry a release lever for the resetting lever of the approach catch.

Further objects and features of the invention together with details of the advantages obtained thereby will be apparent from the following description of the embodiments of the invention shown in the accompanying drawings, in which:

Figure 4 illustrates from below another form of construction of the driving gear with a geared motor and a guide plate in the starting position, the swung-out position of the part being shown in broken lines.

Figure 5 is a corresponding view of a further embodiment of the driving gear consisting of a geared motor and toothed segments.

Figure 6 is a diagrammatic view illustrating the mounting of the approach catch.

Figure 7 illustrates in plan view of a crank of the geared motor.

Figure 1:
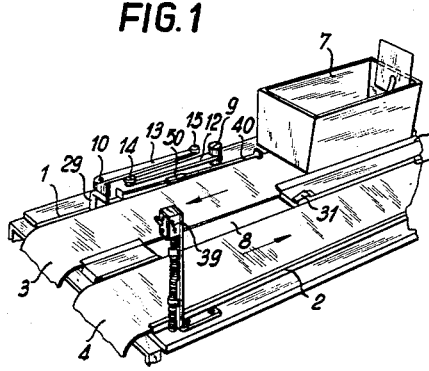
Figure 1 illustrates perspectively a device for the transfer of boxes on oppositely moving conveyor belts, with the arms for laterally transferring the boxes in their starting or inoperative position.
Figure 2:
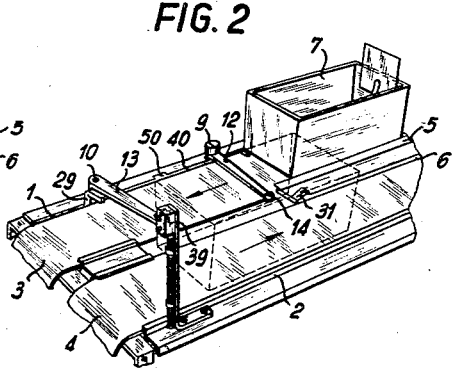
Figure 2 illustrates the same form of construction but with the arms in the swung-out position, a transferred box being shown in broken lines.

Between outer guides 1 and 2 an incoming or approach conveyor belt 3 and an outgoing conveyor belt 4 travel in opposite directions. An inner guide 5, 6 is disposed between the belts 3, 4. A "tote" box 7 fitted with rollers, is shown on the incoming belt 3. The inner guides 5, 6 are removed or interrupted at the transfer point of the "tote" box by the length of a "tote" box and the space between the conveyor belts 3 and 4 is bridged by a plate 8 which projects under the incoming belt 3 and over the outgoing belt 4. Belts 9, 10 are rotatably passed through a base plate 11 on the outer guide 1 in the region of the transfer point. The base plate 11 is secured by means of screws 11a to the lower side of the conveyor belt frame. Horizontal arms 12 and 13, which are provided with rollers 14 and 15 on their free ends, are secured at various levels above the base plate 11. The drive for the arms 12 and 13 is mounted beneath the base plate 11 and preferably on its lower face.

Figure 3:
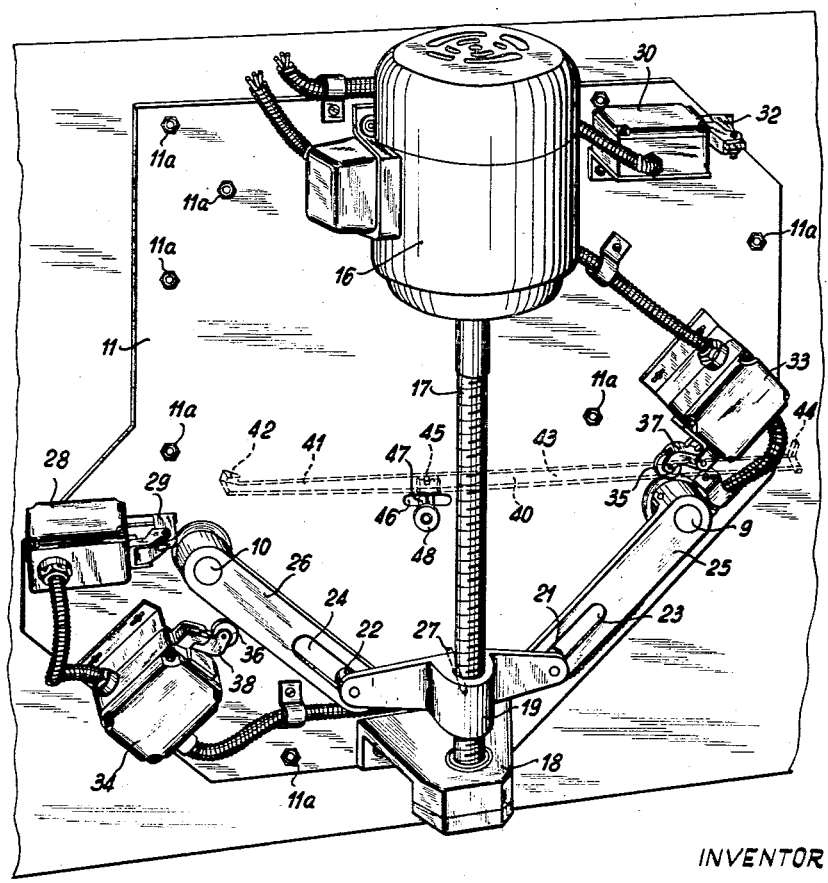
Figure 3 illustrates on a larger scale one embodiment of the drawing gear of the apparatus and shows diagrammatically and from below a reversing motor and a threaded spindle thereof in the starting position.

In the embodiment shown in Figure 3, a reversing motor 16 is coupled with a threaded spindle 17 which is mounted in a support 18 and has a spindle nut 19 disposed thereon. A cross head 20, the end of which is provided with roller bolts 21, 22, is secured to the spindle nut 19. The bolts 21, 22 project into guide slots 23, 24 of actuating levers 25, 26 which form part of the driving gear and are mounted torsion-proof on the bolts 9 and 10. A release pin 27 is mounted in the centre of the cross head 20 and extends vertically to the plane of movement of the latter. An electric "on" switch 28 is so fitted that the rectangular end of its stop lever 29, passing through a slot in the base plate 11, extends over the incoming belt conveyor 3 at the end of the transfer point. A safety switch 30 is so arranged that its switch lever 32, which is provided with a wedge-shaped attachment 31 for example, projects into the outgoing path through a slot in the base plate 11. A reversing switch 33 and a cut out switch 34 are respectively fitted with rollers 35, 36 on their switch levers 37, 38, which are disposed within the pivoting ranges of the actuating levers 25, 26. A hand switch 39, located in the supply lead for the "on" switch 28 is secured to the outer guide 2.

An approach catch 40 is constructed as a double-armed lever which has a wedge-shaped attachment 42 on its short arm 41, for example, and a stop 44 on its long arm 43. A resetting lever 45 engages with the lever 40 at almost a right angle. The resetting lever 45 projects through a slot 46 in the base plate 11 and is provided with a carrier 47 having a roller 48. The approach catch 40 is rotatably mounted on a bearing member 50 by a connecting screw 49 which acts as a pivoting bearing bolt, and is so fitted into the outer guide 1 that the wedge-shaped attachment 42 on the arm 41, when viewed in the direction of travel, projects into the path of the "tote" box near the stop lever 29 when the stop 44 on the arm 43 abuts the outer guide 1. The distance of the wedge-shaped attachment 42 from the stop 44 is greater than the length of a "tote" box.

In the modified construction according to Figure 4 a geared motor 51 having a crank 52 (Figure 7) is connected by a toggle link 53 to a guide plate 54, or the like. The guide plate 54 is disposed torsion-proof on the bolt 9 of one arm 12 and is connected to an actuating lever 56 by a toggle link 55, said lever 56 being secured in a similar manner to the bolt 10 of the other arm 13 and fitted with a release finger 57. The crank 52 has an oppositely directed extension 58 into whose path of rotation projects the switch lever 60, provided with a roller 59, of a cut out switch 61 for the geared motor 51. The roller 59 of the switch lever 60 is disposed outside the path of rotation of the crank 52 and in the pivotal range of the extension 58. The arrangement of an "on" switch 28, the safety switch 30 and the approach catch 40 is the same as in the embodiment according to Figure 3.

In another form of construction according to Figure 5 toothed segments 62, 63, secured to the bolts 9, 10 are interengaged, the toothed segment 62 being connected by the toggle link 53 with the crank 52 of the geared motor 51. A release lever 64 for the approach catch 40 is mounted on the toothed segment 62. The arrangement of the switches 28, 30, 61 and of the approach catch 40 is the same as in the construction according to Figure 4.

The apparatus operates as follows:

First the "on" switch 28 is electrically energised by the hand switch 39. The "tote" box 7 approaching on the incoming belt 3 slides across the stop 44 of the approach catch 40 and moves into the transfer point. As it does so, it depresses by its lower side the wedge-shaped attachment 42 of the approach catch 40 so that the long arm 43 having to elevate the stop 44 is raised immediately behind the "tote" box 7 into the path of any following "tote" box and prevent such box from moving into the transfer point. The "tote" box 7 collides with the stop lever 29 of the "on" switch 28 as it continues to move and consequently switches on the reversing motor 16. The spindle nut 19, including its cross head 20 and the roller bolts 21, 22, is moved on the threaded spindle 17 towards the reversing motor 16 and thereby turns the actuating levers 25, 26 in the guide slots 23, 24 of which the roller bolts 21, 22 move respectively about the bolts 9, 10. Simultaneously the arms 12, 13 are swung in opposite directions about the axes of the bolts 9, 10 into the approach path and transfer the "tote" box 7 on to the removing belt conveyor 4 sideways over the plate 8. With the lateral movement of the "tote" box 7 the latter again releases the wedge-shaped attachment 42 of the approach catch 40 and the double armed lever 41, 43 therefore falls back into its starting position, unless it is retained in the locked position, owing to the effect of pressure and friction, by an immediately following "tote" box. If the arms 12 and 13 are pivoted through an arc of 90°, the "tote" box 7 is completely disposed on the outgoing belt 4.

The direction of rotation of the threaded spindle 17 is reversed by the contact of the actuating lever 25 with the roller 35 of the reversing switch 33. The spindle nut 19 is thus returned to its starting position and takes with it the arms 12, 13, as previously, by means of the actuating levers 25, 26. In the starting position the reversing motor 16 is switched off by the actuating lever 26 striking against the roller 36 of the cut out switch 34. The "tote" box 7 transferred to the outgoing belt 4 depresses the wedge-shaped attachment 31 of the safety switch 30 by its lower side and thereby puts the "on" switch 28 out of action during the time it slides across the attachment 31. This prevents a following "tote" box which has not been held by the approach catch 40, from being transferred before the previous one has left the transfer point. It a "tote" box 7 has run against the stop 44 of the approach catch and the double-armed lever 41, 43 does therefore not fall back into its starting position, the catch is raised when the release pin 27 on the cross head 20 actuates the resetting lever 45 at the end of the outswinging movement. The "tote" box may then travel into the transfer position. If the transfer apparatus is to be put out of operation, the hand switch 39 is thrown; "tote" boxes, which have not previously been in circulation, may now be mounted by hand on the outgoing belt 4, for example. If the hand switch 39 is again switched on and another new "tote" box is disposed on the outgoing belt 4 at the transfer point, a "tote" box is not transferred again before the new one releases the wedge-shaped attachment 31 of the safety switch 30, that is to say, when it has left the transfer point.

The drive of the transfer apparatus shown in Figure 4 is effected by a geared motor 51 which is also switched on by an "on" switch 28 and turns the crank 52. This rotary movement is converted into a reciprocating movement by means of the toggle link 53 and thus transmitted to the guide plate 54 which pivots by the arm 12, about the axis of the bolt 9. The motion of the arm 13 is derived from the motion of the guide plate 54 by means of a toggle link 55 and actuating lever 56 which pivots about the axis of the bolt 10. One rotation of the crank corresponds to the swinging out and back of the arms. After each rotation of the crank, the geared motor 51 is switched off by the oppositely directed extension 58 of the crank 52 which actuates the switch lever 60 of the switch 61 provided with a roller 59. The release of the approach catch 40, which may be held if required, by an abutting "tote" box, is effected in this case by the release finger 57 on the actuating lever 56 which presses on the roller 48 of the resetting lever 45 at the end of the outswinging movement.

In the construction shown in Figure 5 the 2 toothed segments 62 and 63 connected by the arms 12 and 13 roll on each other and are driven through the geared motor 51 by the crank 52 by means of the toggle link 53. The control of the geared motor is effected as in the construction shown in Figure 4. The approach catch is raised by the release lever 64 on the toothed segment 62 returning the resetting lever 45 of the approach catch 40 at the end of the outward-swinging movement.

It will be appreciated that changes in the details, which have been herein described and illustrated for the purpose of explaining the nature of the invention, may be made by those skilled in the art without departing from the principle and scope of the invention as determined by the appended claims.

I claim:

1. Apparatus for transferring "tote" boxes laterally from one conveyor to another running beside it, comprising a plate member for bridging the gap between the two conveyors at the transfer point, a motor, a switch for energizing said motor and operated by a "tote" box approaching the transfer point, pivotal means at said transfer point and operated by said motor for laterally displacing said tote box from one conveyor to the other independently of the forward movement of the conveyor on which said box is mounted, means for de-energizing said switch and for reversing said motor and said pivotal means after a predetermined pivotal displacement of said means, an approach catch for preventing a following box reaching the transfer point while the latter is occupied by a box being transferred and catch means engaged by a transferred box, departing from said transfer point, for preventing re-energizing of said switch until said transferred box is clear of said transfer point, wherein said pivotal means comprises a pair of arms at one side of the conveyor bringing boxes to the loading point and spaced longitudinally of said conveyor, a driving gear between said motor and said arms operating to angularly displace said arms in opposed directions to engage a side of a box for its lateral transfer from one conveyor to the other across said plate, and including a double armed lever on the end of one arm of which is arranged the approach catch and on the end of its opposed and shorter arm is disposed a wedge-shaped attachment which is downwardly displaceable by a "tote" box running into the transfer point, and further including a resetting lever and a release member for said lever and displaceable with said driving gear.

2. Apparatus for transferring "tote" boxes laterally from one conveyor to another running beside it, comprising a plate member for bridging the gap between the two conveyors at the transfer point, a motor, a switch for energizing said motor and operated by a "tote" box approaching the transfer point, pivotal means at said transfer point and operated by said motor for laterally displacing said tote box from one conveyor to the other independently of the forward movement of the conveyor on which said box is mounted, means for de-energizing said switch and for reversing said motor and said pivotal means after a predetermined pivotal displacement of said means, an approach catch for preventing a following box reaching the transfer point while the latter is occupied by a box being transferred and catch means engaged by a transferred box, departing from said transfer point, for preventing re-energizing of said switch until said transferred box is clear of said transfer point, and including a base plate located below the conveyors at the transfer point for the support of said motor, said switch for energizing said motor and said de-energizing means, and including a cutout switch, a reversing switch, a bearing member for said approach catch, and bearing members for said driving gear between said energizing switch and said motor, all of said switches and said members being supported by said base plate.

3. Apparatus as claimed in claim 2 in which said driving gear includes a threaded spindle of said motor, a cross head on said spindle and provided at its ends with roller pins, actuating levers on said bearing members and slotted to receive said roller pins by which they are angularly displaced to rotate said pivotal means for laterally displacing the boxes on axial displacement of said cross head along said spindle.

4. Apparatus as claimed in claim 3 and wherein said reversing switch and said cut-out switch for the motor are arranged within the pivoting ranges of said actuating levers.

5. Apparatus as claimed in claim 3 and including a release pin carried by said cross head and resetting means for said approach catch operated by said pin after a predetermined displacement of said cross head.

References Cited in the file of this patent

UNITED STATES PATENTS

| | | |
|---|---|---|
| 682,083 | James | Sept. 3, 1901 |
| 1,557,765 | Nicholas | Oct. 20, 1925 |
| 1,763,809 | Murphy | June 17, 1930 |
| 1,881,895 | Olson | Oct. 11, 1932 |
| 1,914,779 | Libby | June 20, 1933 |
| 1,978,004 | Winkley | Oct. 23, 1934 |
| 1,978,005 | Winkley | Oct. 23, 1934 |
| 2,375,863 | Mitchell | May 15, 1945 |
| 2,380,172 | Harber | July 10, 1945 |
| 2,652,137 | Taranto | Sept. 15, 1953 |